United States Patent
Huang et al.

(10) Patent No.: US 11,445,478 B2
(45) Date of Patent: Sep. 13, 2022

(54) SYSTEMS AND METHODS FOR ADAPTING PARAMETERS IN SIDELINK COMMUNICATIONS

(71) Applicant: ZTE CORPORATION, Guangdong (CN)

(72) Inventors: Ying Huang, Guangdong (CN); Mengzhen Wang, Guangdong (CN); Lin Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/784,057

(22) Filed: Feb. 6, 2020

(65) Prior Publication Data

US 2020/0178216 A1    Jun. 4, 2020

Related U.S. Application Data

(63) Continuation of application No. PCT/CN2017/097257, filed on Aug. 11, 2017.

(51) Int. Cl.

| | |
|---|---|
| *H04W 72/02* | (2009.01) |
| *H04W 76/11* | (2018.01) |
| *H04W 4/40* | (2018.01) |
| *H04W 76/27* | (2018.01) |
| *H04L 1/00* | (2006.01) |
| *H04L 1/18* | (2006.01) |
| *H04L 27/36* | (2006.01) |
| *H04W 72/04* | (2009.01) |
| *H04W 80/02* | (2009.01) |
| *H04W 92/18* | (2009.01) |

(52) U.S. Cl.
CPC .......... *H04W 72/02* (2013.01); *H04L 1/0003* (2013.01); *H04L 1/1819* (2013.01); *H04L 27/362* (2013.01); *H04W 4/40* (2018.02); *H04W 72/0473* (2013.01); *H04W 76/11* (2018.02); *H04W 76/27* (2018.02); *H04W 80/02* (2013.01); *H04W 92/18* (2013.01)

(58) Field of Classification Search
None
See application file for complete search history.

(56) References Cited

U.S. PATENT DOCUMENTS

| | | |
|---|---|---|
| 2012/0015607 A1 | 1/2012 | Koskela et al. |
| 2016/0050698 A1 | 2/2016 | Siomina |
| 2017/0208638 A1* | 7/2017 | Baghel ............... H04W 52/383 |
| 2018/0035427 A1* | 2/2018 | Gupta .................. H04L 1/0026 |
| 2018/0049073 A1* | 2/2018 | Dinan ............... H04W 72/1263 |
| 2018/0279275 A1* | 9/2018 | Chen ..................... H04W 76/14 |

(Continued)

FOREIGN PATENT DOCUMENTS

| | | |
|---|---|---|
| WO | 2016161757 A1 | 10/2016 |
| WO | 2016165385 A1 | 10/2016 |

*Primary Examiner* — Anh Vu H Ly
(74) *Attorney, Agent, or Firm* — Duane Morris LLP

(57) ABSTRACT

Systems and methods for adapting parameters in wireless sidelink communications are disclosed herein. In one embodiment, a method performed by a first node is disclosed. The method comprises: transmitting a wireless signal to a second node; and receiving a control signal from the second node, wherein the control signal is generated by the second node based on the wireless signal and includes information for controlling sidelink communication between the first node and at least one third node.

20 Claims, 12 Drawing Sheets

(56) References Cited

U.S. PATENT DOCUMENTS

2018/0324010 A1* 11/2018 Gulati .................. H04L 1/0016
2020/0163028 A1* 5/2020 Chae ................... H04W 52/241
2020/0163155 A1* 5/2020 Lee ...................... H04L 5/0053
2020/0305167 A1* 9/2020 Freda ................ H04W 72/0446

* cited by examiner

SYSTEMS AND METHODS FOR ADAPTING PARAMETERS IN SIDELINK COMMUNICATIONS

TECHNICAL FIELD

The disclosure relates generally to wireless communications and, more particularly, to systems and methods for adapting parameters in wireless sidelink communications.

BACKGROUND

Proximity-based communication technologies such as D2D (Device-to-Device) and V2X (Vehicle-to-Everything) are attracting more and more attention and research. It can be applied to public safety, car networking, field command, social networking, electronic payment, local advertising, game entertainment, network coverage enhancement, etc. A D2D system may be applied in scenarios with network coverage, with partial network coverage, or without network coverage, allowing direct discovery or direct communication between multiple user equipment (UEs) supporting D2D. A direct communication between two UEs is typically referred to as a sidelink (SL) communication, where the two UEs may be in a D2D or V2X system. D2D technology can reduce burden on a cellular network, reduce battery power consumption of the UE, improve data rate, improve robustness of the network infrastructure, meet requirements of high data rate services and proximity services, and support direct communication without network coverage, to meet requirements of public security and other special communication needs.

Car network communication can realize real-time information exchanges between car and car, between car and roadside infrastructure, between car and pedestrian, by informing each other's current state (including the vehicle's location, speed, acceleration, driving path, etc.), obtaining road environment information, collaborative awareness of road hazards, and providing a variety of collision warning information in a timely manner to prevent road traffic accidents. Car network communication can be divided into several modes: Vehicle-to-Vehicle (V2V) communications, Vehicle-to-Pedestrian (V2P) communications, Vehicle-to-Infrastructure (V2I) communications, Vehicle-to-Network (V2N) communications, where the above-mentioned car network communication modes can be collectively referred to as Vehicle-to-Everything (V2X) communications. In the V2X communication study based on LTE (Long Term Evolution) organized by 3GPP (3rd Generation Partnership Project), V2X communication based on sidelink between UEs is one way to realize the V2X standard. That is, business data is not forwarded through the base station and the core network, but directly sent from the source UE through the air interface to the target UE. This V2X communication is referred to as sidelink-based V2X communication.

In existing D2D systems, the sidelink communication does not support a feedback mechanism. In addition, even after enabling the sidelink to support a feedback mechanism, there is no satisfactory solution for the problem of how the base station can control the sidelink transmission parameters, in a scenario when a remote UE accesses the network through a relay UE, in existing literatures or existing technologies. Further, an eV2X (evolved V2X) system poses a higher demand for the transmission data rate of sidelink communications. But existing literatures or and technologies do not provide any way to support a high data rate, e.g. a modulation scheme of 64 QAM (quadrature amplitude modulation), in sidelink communications.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first node is disclosed. The method comprises: transmitting a wireless signal to a second node; and receiving a control signal from the second node, wherein the control signal is generated by the second node based on the wireless signal and includes information for controlling sidelink communication between the first node and at least one third node.

In a further embodiment, a method performed by a first node is disclosed. The method comprises: receiving a wireless signal from a second node, wherein the wireless signal is related to sidelink communication between the second node and at least one third node; generating a control signal based on the wireless signal, wherein the control signal includes information for controlling the sidelink communication between the second node and the at least one third node; and transmitting the control signal to the second node.

In a different embodiment, a communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
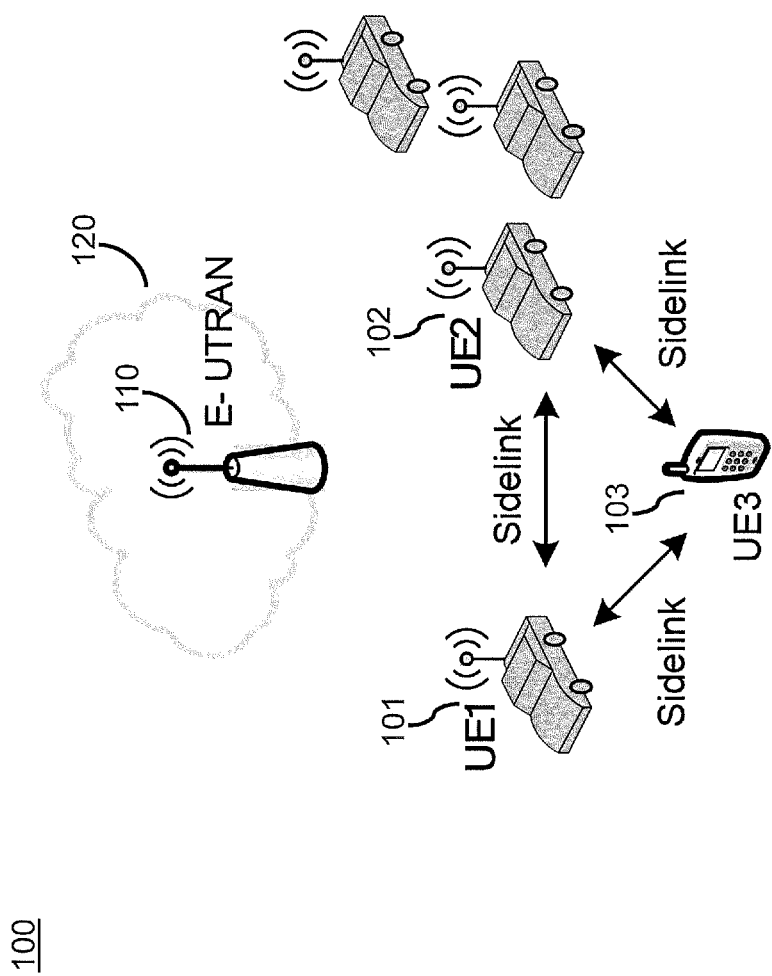
FIG. 1 illustrates an exemplary V2X communication network in which techniques disclosed herein may be implemented, in accordance with an embodiment of the present disclosure.

FIG. 1 illustrates an exemplary V2X communication network 100 in which techniques disclosed herein may be implemented, in accordance with an embodiment of the present disclosure. As shown in FIG. 1, multiple UEs 101, 102, 103 in the V2X communication network 100 can communicate based on sidelinks connecting each pair of the UEs. That is, traffic data is not forwarded through the base station (BS) 110 or the core network 120, but directly sent from a source UE through the air interface to a target UE. This V2X communication is referred to as sidelink-based V2X communication. An eV2X (evolved V2X) system poses a higher demand for the data rate of sidelink communications. As such, the present teaching discloses methods for a UE to support a high data rate, e.g. a modulation scheme of 64 QAM in sidelink communications in V2X or D2D networks.

Figure 2A:
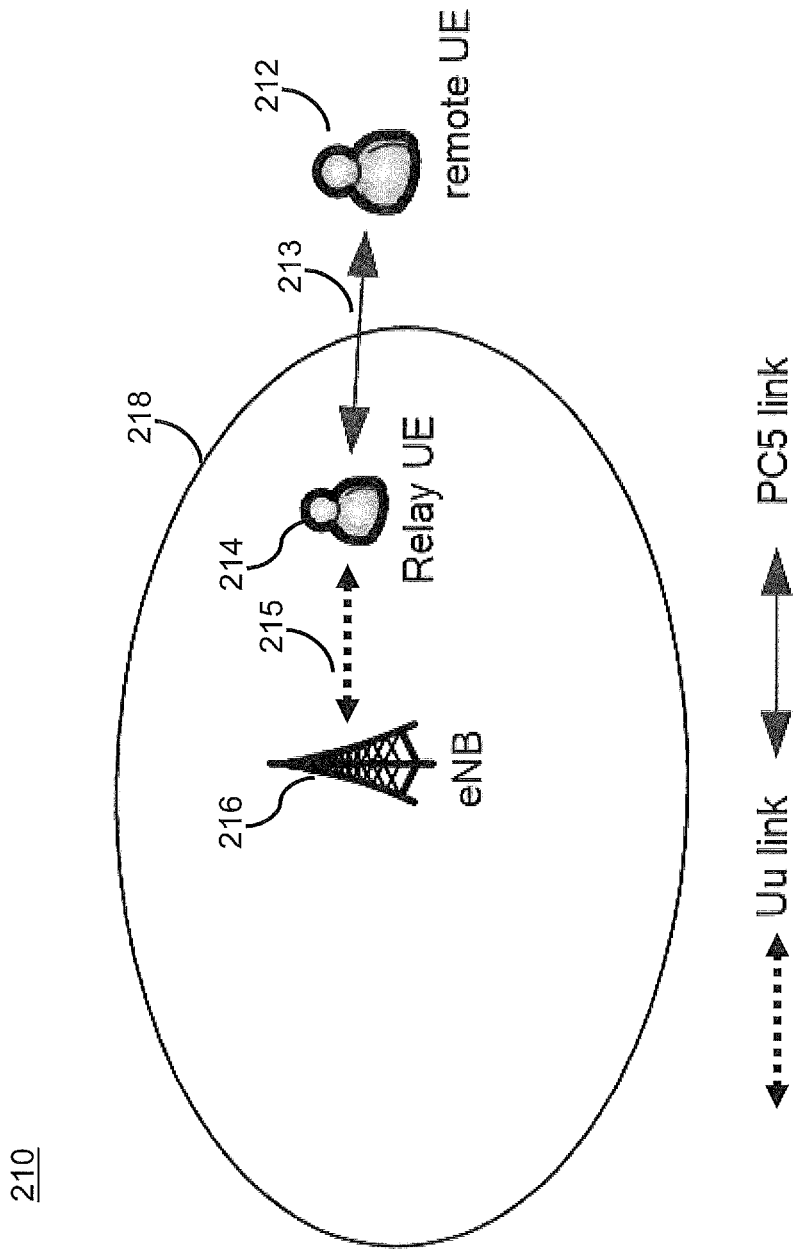
FIG. 2A illustrates an exemplary D2D communication network in which techniques disclosed herein may be implemented, in accordance with an embodiment of the present disclosure.

FIG. 2A illustrates an exemplary D2D communication network 210 in which techniques disclosed herein may be implemented, in accordance with an embodiment of the present disclosure. As shown in FIG. 2A, a relay UE 214, which is located within the coverage 218 of a BS 216 in the cellular network, acts as a relay node so that a remote UE 212, which is located on the edge of or outside the coverage 218 of the cellular network, can communicate with the network through the relay UE 214 serving as a relay node. In addition, D2D communication can be performed between the D2D UEs through the relay node UE. That is, a third UE may communicate with the remote UE 212, through the relay UE 214. In FeD2D (Further-enhanced Device-to-Device) technology, a wearable device, e.g. an MTC (Machine Type Communications) or NB-IoT (narrow band Internet of Things) device, may access the network through the relay UE to achieve an energy-saving effect. In some embodiments, the interface between D2D UEs on a sidelink is called PC5 interface/link 213; while the interface between a D2D UE and a BS (eNB) is called a Uu interface/link 215.

In order to improve the reliability of a sidelink, e.g. the PC5 link, a D2D or V2X system may enable the sidelink to support a feedback mechanism. The present teaching discloses methods for how a BS to obtain sidelink feedback information for adjusting the sidelink transmission parameters, e.g. in a scenario when a remote UE accesses the network through a relay UE.

Figure 2B:
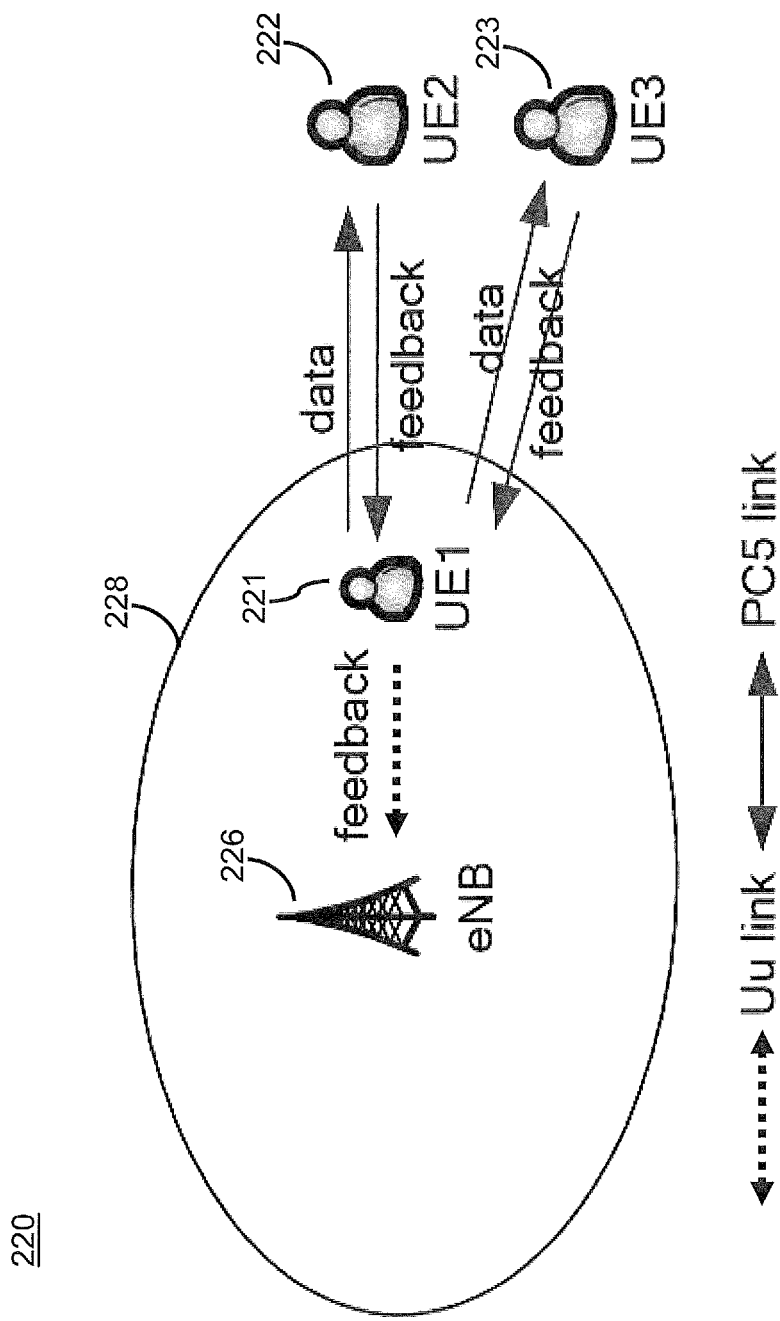
FIG. 2B illustrates an exemplary network environment for adapting parameters in wireless sidelink communications, in accordance with some embodiments of the present disclosure.

FIG. 2B illustrates an exemplary network environment 220 for adapting parameters in wireless sidelink communications, in accordance with some embodiments of the present disclosure. As shown in FIG. 2B, UE1 221 is located within the coverage 228 of a BS 226 in the cellular network and acts as a relay node so that remote UEs (UE2 222 and UE3 223), which are located outside the coverage 228 of the cellular network, can communicate with the network through the UE1 221.

In one embodiment, after UE1 221 transmits data on sidelinks to the remote UEs (UE2 222 and UE3 223), UE1 221 receives feedback information from the remote UEs. The feedback information can indicate whether the sidelink transmission was successful or not. For example, the feedback information may include an acknowledgement (ACK) to signify successful receipt of a message or packet transmitted via the sidelink, or a negative acknowledgement (NACK) to signify a rejection or error of the message or packet transmitted via the sidelink. The UE1 221 can forward the received feedback information, with or without further processing of the feedback information, to the BS 226, such that the BS 226 can control the parameters used for the sidelink transmissions from the UE1 221 to the remote UEs. For example, the BS 226 may schedule resources, adjust the transmission parameters, or change transmission resource pools for UE1 221, based on the forwarded feedback information. When the sidelink is reciprocal, e.g. in D2D or V2X, the BS 226 can also control the parameters used for the sidelink transmissions from the remote UEs (UE2 222 and UE3 223) to the UE1 221.

The methods disclosed in the present teaching can be implemented in a cellular communication network, which includes one or more cells. Each cell may include at least one BS operating at its allocated bandwidth to provide adequate radio coverage to its intended users, e.g. UE devices. In various embodiments, a BS in the present disclosure can include, or be implemented as, a next Generation Node B (gNB), an E-UTRAN Node B (eNB), a Transmission/Reception Point (TRP), an Access Point (AP), etc. A BS and a UE device can communicate with each other via a communication link, e.g., via a downlink radio frame from the BS to the UE or via an uplink radio frame from the UE to the BS. Two UEs can communicate with each other via a sidelink. A BS and a UE may be described herein as non-limiting examples of "communication nodes," or "nodes" generally, which can practice the methods disclosed herein and may be capable of wireless and/or wired communications, in accordance with various embodiments of the present disclosure.

Figure 3:
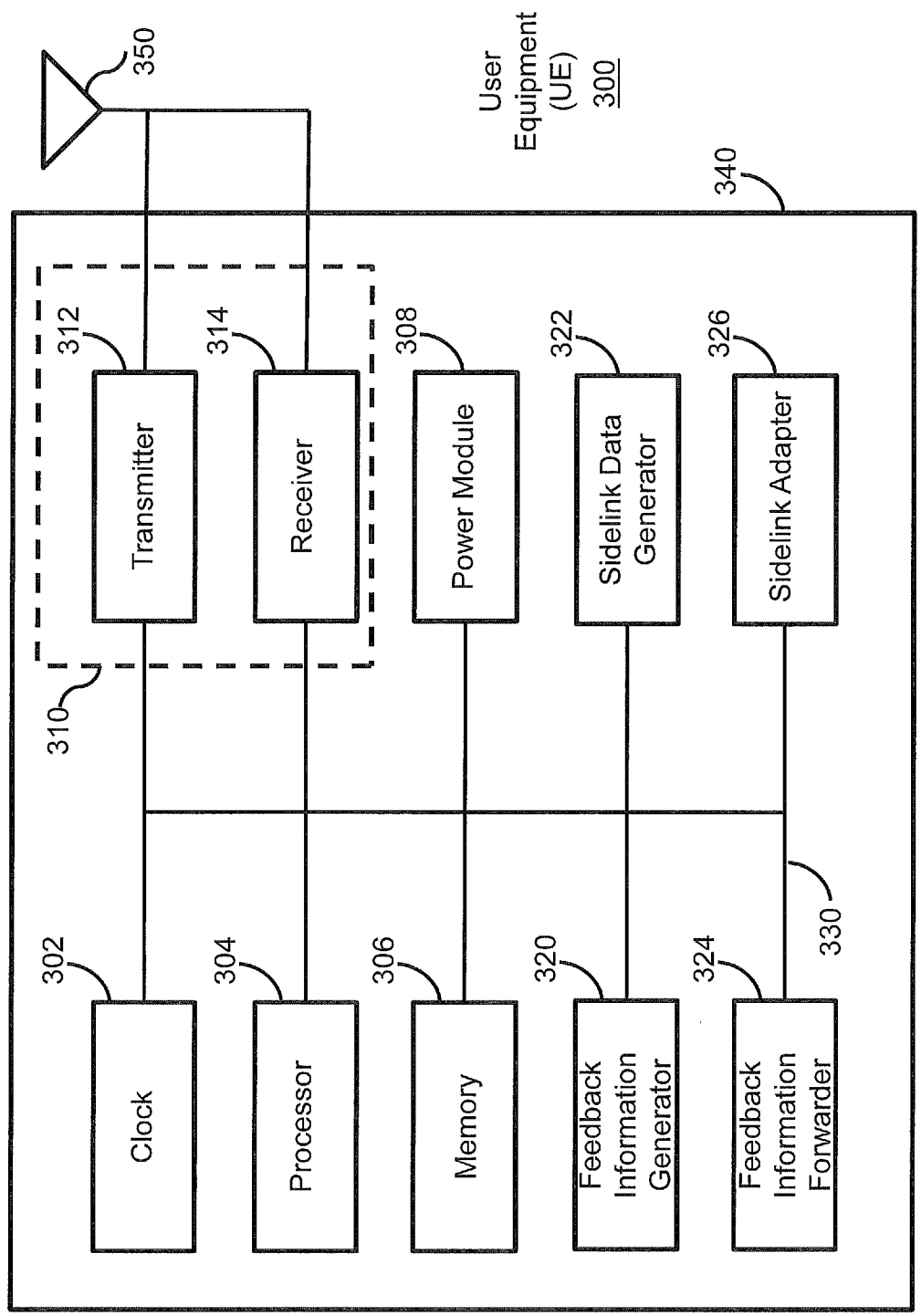
FIG. 3 illustrates a block diagram of a user equipment (UE), in accordance with some embodiments of the present disclosure.

FIG. 3 illustrates a block diagram of a user equipment (UE) 300, in accordance with some embodiments of the present disclosure. The UE 300 is an example of a device that can be configured to implement the various methods described herein. As shown in FIG. 3, the UE 300 includes a housing 340 containing a system clock 302, a processor 304, a memory 306, a transceiver 310 comprising a transmitter 312 and receiver 314, a power module 308, a feedback information generator 320, a sidelink data generator 322, a feedback information forwarder 324, and a sidelink adapter 326.

In this embodiment, the system clock 302 provides the timing signals to the processor 304 for controlling the timing of all operations of the UE 300. The processor 304 controls the general operation of the UE 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the UE 300 to transmit and receive data to and from a remote device (e.g., the BS or another UE). An antenna 350 is typically attached to the housing 340 and electrically coupled to the transceiver 310. In various embodiments, the UE 300 includes (not shown) multiple transmitters, multiple receivers, multiple transceivers, and/or multiple antennas. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a sidelink communication, a transmission UE transmits data to a receiving UE via the sidelink between them directly. In accordance with various embodiments, the UE 300 may serves as either a transmission UE or a receiving UE in a sidelink communication.

When the UE 300 serves as a transmission UE, the sidelink data generator 322 may generate sidelink data which is desired or requested by a receiving UE. The sidelink data generator 322 may send, via the transmitter 312, the generated data to the receiving UE via sidelink between the two UEs.

When the UE 300 serves as a receiving UE, the feedback information generator 320 can receive, via the receiver 314, some sidelink data from a transmission UE via the sidelink between the two UEs. The feedback information generator 320 may then generate feedback information based on the receipt of the sidelink data. For example, the feedback information generator 320 may generate an acknowledgement (ACK) to signify successful receipt of the data transmitted via the sidelink, or a negative acknowledgement (NACK) to signify a rejection or error of the data transmitted via the sidelink. In other example, the feedback information may include some channel quality indications other than ACK/NACK to indicate the sidelink channel quality, based on the sidelink transmissions.

When the UE 300 serves as a transmission UE, the sidelink data generator 322 may inform the feedback information forwarder 324 to wait for a feedback from the receiving UE. The feedback information forwarder 324 can receive, via the receiver 314, the feedback information generated by the receiving UE (by the feedback information generator 320 in the receiving UE). Then, the feedback information forwarder 324 may forward the feedback information to a BS for controlling and/or adjusting the sidelink communications, e.g. by generating a wireless signal based on the feedback information and transmitting the wireless signal, via the transmitter 312, to the BS. In one embodiment, the wireless signal is transmitted via at least one of: (a) radio resource control (RRC) signaling, and (b) media access control (MAC) control element (CE) with logical channel identity (LCD) that indicates a type of the MAC CE.

In one embodiment, the UE 300 transmits sidelink data to at least one receiving UE and receives the feedback information from the at least one receiving UE. Then the forwarded feedback information transmitted by the feedback information forwarder 324 includes: identity information for the at least one receiving UE; and the feedback information received from the at least one receiving UE. For example, the feedback information received from the at least one receiving UE may include at least one of: one or more process numbers each of which identifies a process, e.g. HARQ (Hybrid Automatic Repeat Request) process, running through a sidelink transmission from the UE 300 to the at least one receiving UE; and acknowledgement or negative acknowledgement indicating a sidelink transmission was successful or not in each process.

In another embodiment, the UE 300 transmits sidelink data to at least one receiving UE and receives the feedback information from the at least one receiving UE. Then the forwarded feedback information transmitted by the feedback information forwarder 324 includes: identity information for the at least one receiving UE; and an ACK ratio, i.e. a ratio between a total number of acknowledgements received from the at least one receiving UE and a total number of sidelink transmissions to the at least one receiving UE during a certain time period.

It can be understood that in other embodiments, the feedback information may be in other forms to represent a quality or state of the sidelink communications between the UE 300 and the at least one receiving UE.

The sidelink adapter 326 may receive, via the receiver 314, a control signal from the BS. The control signal is generated by the BS based on the wireless signal carrying the forwarded feedback information and includes information for controlling sidelink communications of the UE 300. The sidelink adapter 326 can then adapt parameters in the sidelink communications based on the control signal. In one embodiment, the sidelink adapter 326 can determine or adjust a modulation scheme to be used in the sidelink communication based on the control signal. In one embodiment, the control signal is received via at least one of: RRC signaling, MAC CE, and physical downlink control channel (PDCCH).

The power module 308 can include a power source such as one or more batteries, and a power regulator, to provide regulated power to each of the above-described modules in FIG. 3. In some embodiments, if the UE 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the UE 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the feedback information forwarder 324, e.g. calculating the ACK ratio. Conversely, each of the modules illustrated in FIG. 3 can be implemented using a plurality of separate components or elements.

Figure 4:
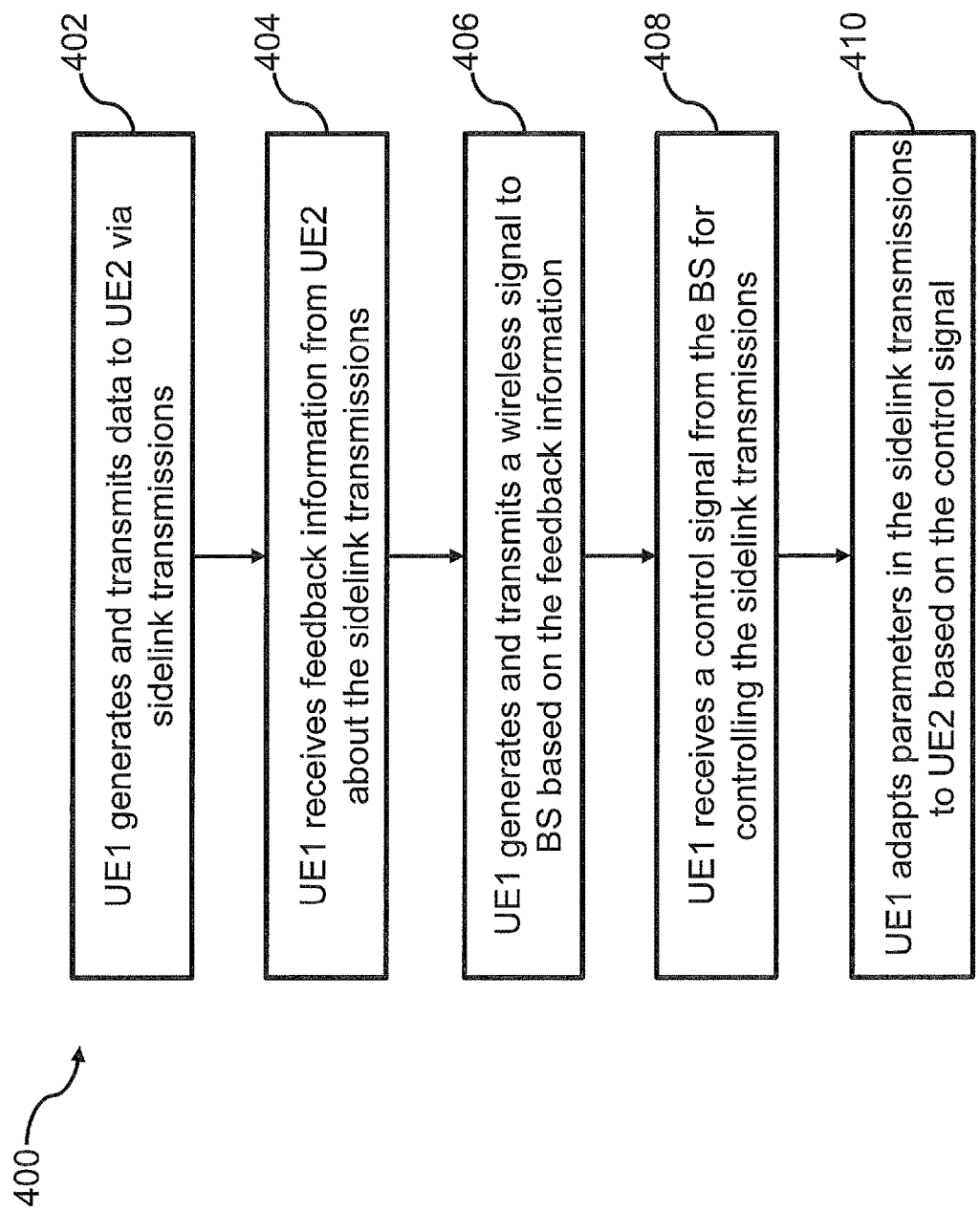
FIG. 4 illustrates a flow chart for a method performed by a UE for adapting parameters in wireless sidelink communications, in accordance with some embodiments of the present disclosure.

FIG. 4 illustrates a flow chart for a method 400 performed by a UE, e.g. the UE 300 as shown in FIG. 3, for adapting parameters in wireless sidelink communications, in accordance with some embodiments of the present disclosure. In this example, the UE 300 may serve as the UE1 221 in FIG. 2B, and as a transmission UE to transmit sidelink data to one or more remotes UEs (UE2 222 and UE3 223). The example shows a process for adapting parameters in wireless sidelink communications from UE1 to UE2, while other wireless sidelink communications, e.g. from UE1 to UE3, can be adjusted and adapted similarly.

At 402, UE1 generates and transmits data to UE2 via sidelink transmissions. UE1 receives at 404 feedback information from UE2 about the sidelink transmissions. UE1 generates and transmits at 406 a wireless signal to BS based on the feedback information. At 408, UE1 receives a control signal from the BS for controlling the sidelink transmissions. Then at 410, UE1 adapts parameters in the sidelink transmissions to UE2 based on the control signal.

Figure 5:
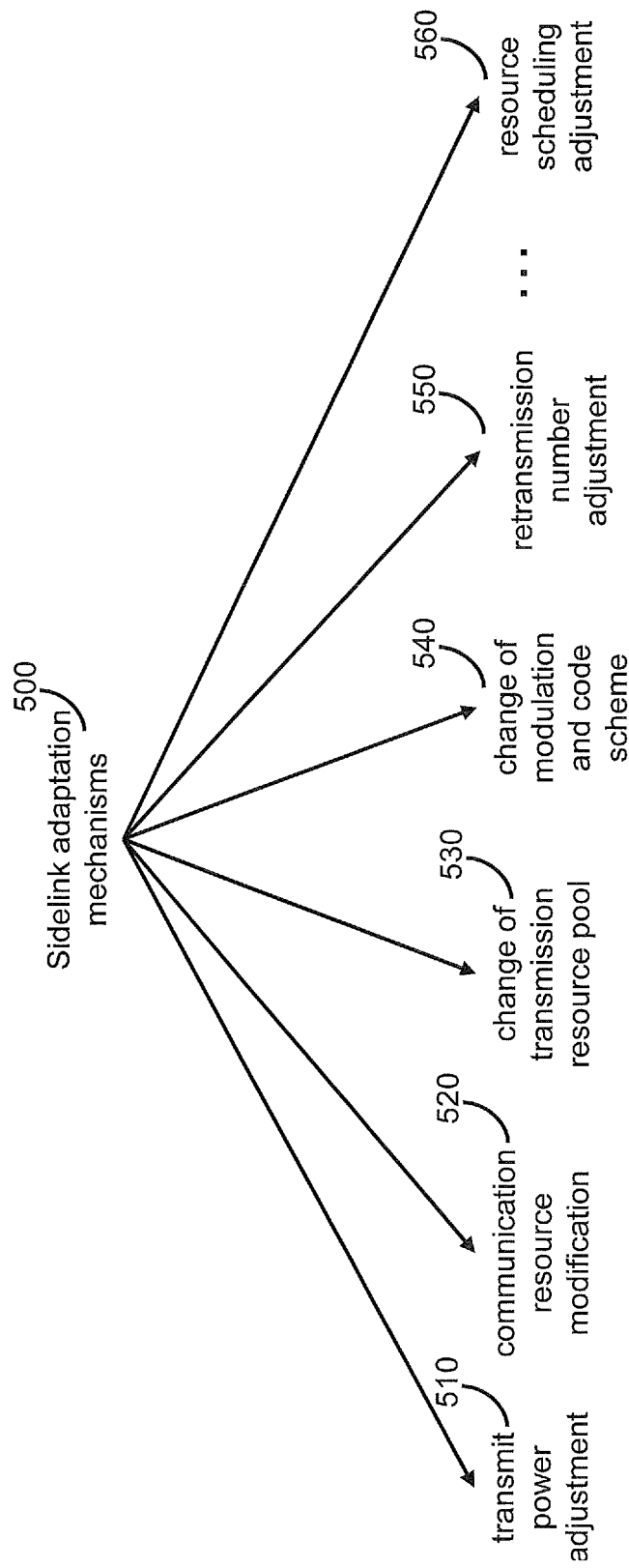
FIG. 5 illustrates exemplary sidelink adaptation mechanisms for adapting parameters in wireless sidelink communications, in accordance with some embodiments of the present disclosure.

FIG. 5 illustrates exemplary sidelink adaptation mechanisms 500 for adapting parameters in wireless sidelink communications, in accordance with some embodiments of the present disclosure. The control signal sent by the BS to the relay UE (transmission UE) can include various instructions related to sidelink adaptation mechanisms for the sidelink transmissions from the relay UE. For example, as shown in FIG. 5, some sidelink adaptation mechanisms 500 include: adjusting transmit power or maximum transmit power of at least one of the sidelink transmissions 510; modifying communication resource for at least one of the sidelink transmissions 520; changing a transmission resource pool for at least one of the sidelink transmissions 530; changing a modulation and coding scheme (e.g. a modulation rate, a modulation order) for at least one of the sidelink transmissions 540; adjusting retransmission number or maximum retransmission number 550; and adjusting resource scheduling 560, e.g. switching a resource scheduling subject, for at least one of the sidelink transmissions.

In one example, when feedback information indicates an increase of the channel qualify on the sidelink, the control signal may indicate an increase of modulation rate on the sidelink communications. In another example, when feedback information indicates a decrease of the channel qualify on the sidelink, the control signal may indicate a change of transmission resource pool for the sidelink communications. In yet another example, when feedback information indicates a decrease of the channel qualify on the sidelink while the UE self-schedules the resource for the sidelink communications, the control signal may indicate that the resource scheduling for the sidelink communications should be performed by the BS.

Figure 6:
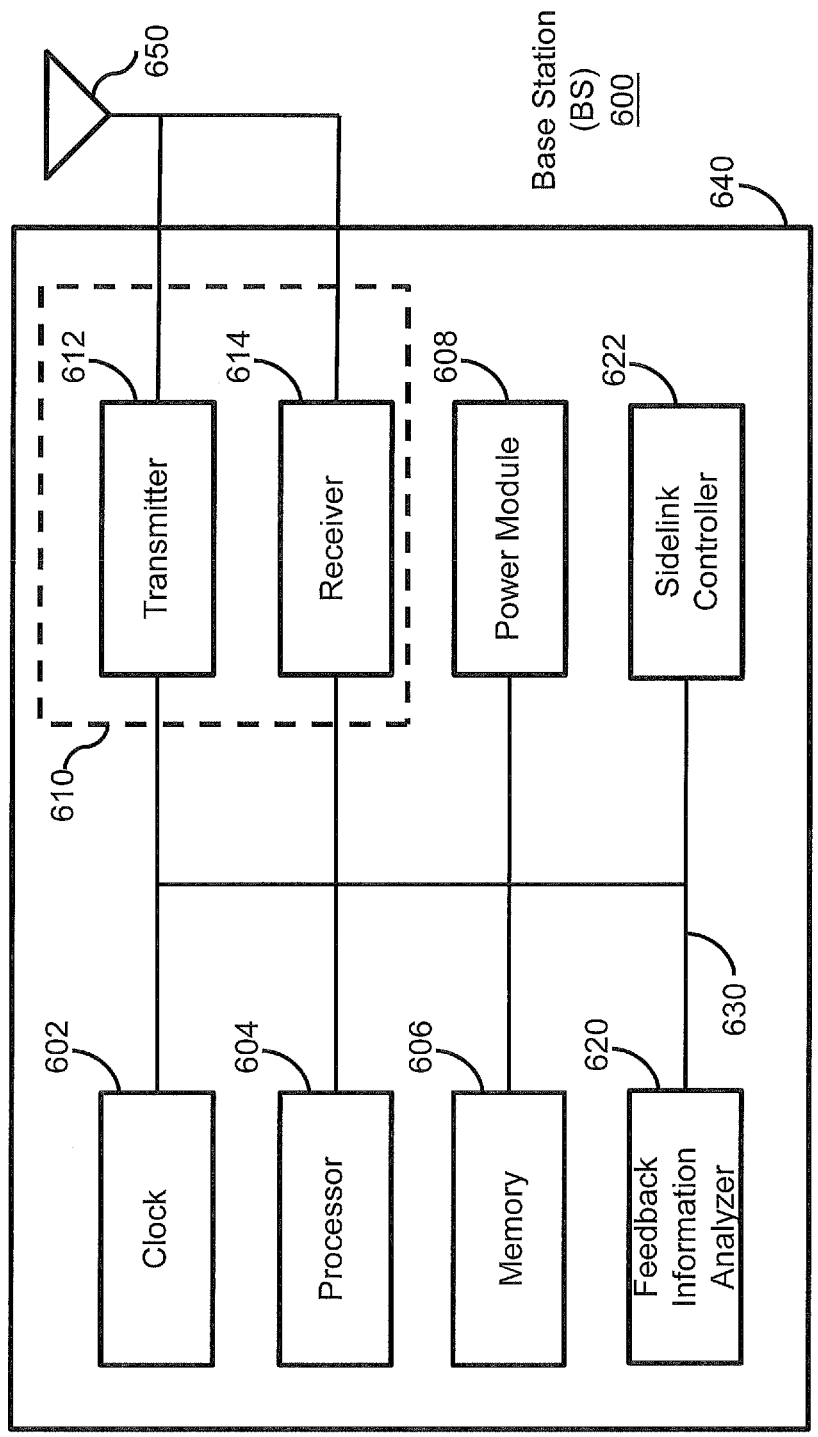
FIG. 6 illustrates a block diagram of a base station (BS), in accordance with some embodiments of the present disclosure.

FIG. 6 illustrates a block diagram of a base station (BS) 600, in accordance with some embodiments of the present disclosure. The BS 600 is an example of a device that can be configured to implement the various methods described herein. As shown in FIG. 6, the BS 600 includes a housing 640 containing a system clock 602, a processor 604, a memory 606, a transceiver 610 comprising a transmitter 612 and a receiver 614, a power module 608, a feedback information analyzer 620, and a sidelink controller 622.

In this embodiment, the system clock 602, the processor 604, the memory 606, the transceiver 610 and the power module 608 work similarly to the system clock 302, the processor 304, the memory 306, the transceiver 310 and the power module 308 in the UE 300. An antenna 650 is typically attached to the housing 640 and electrically coupled to the transceiver 610.

The feedback information analyzer 620 may receive, via the receiver 614, a wireless signal from a UE, e.g. a relay UE. The wireless signal is generated by the UE based on feedback information transmitted by at least one remote UE. The feedback information is associated with sidelink transmissions from the relay UE to the at least one remote UE. As discussed above, the wireless signal may comprise a forwarded or processed version of the feedback information transmitted by the at least one remote UE. In some embodiments, the wireless signal may include at least one of the following: identity information for the at least one remote UE; retransmission indication; resource allocation request indication; size of requested resources; the forwarded or processed version of the feedback information; and a ratio between a total number of acknowledgements received from the at least one third node and a total number of sidelink transmissions to the at least one third node during a certain time period.

The feedback information analyzer 620 may analyze the received wireless signal to determine feedback information about the sidelink transmissions. The feedback information may indicate a state of the sidelink between the relay UE and the at least one remote UE. The feedback information analyzer 620 may inform the sidelink controller 622 about the analyzed feedback information.

The sidelink controller 622 can generate a control signal based on the analyzed feedback information and transmit, via the transmitter 612, the control signal to the relay UE for controlling the sidelink transmissions.

The various modules discussed above are coupled together by a bus system 630. The bus system 630 can include a data bus and, for example, a power bus, a control signal bus, and/or a status signal bus in addition to the data bus. It is understood that the modules of the BS 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 604 can implement not only the functionality described above with respect to the processor 604, but also implement the functionality described above with respect to the feedback information analyzer 620. Conversely, each of the modules illustrated in FIG. 6 can be implemented using a plurality of separate components or elements.

Figure 7:
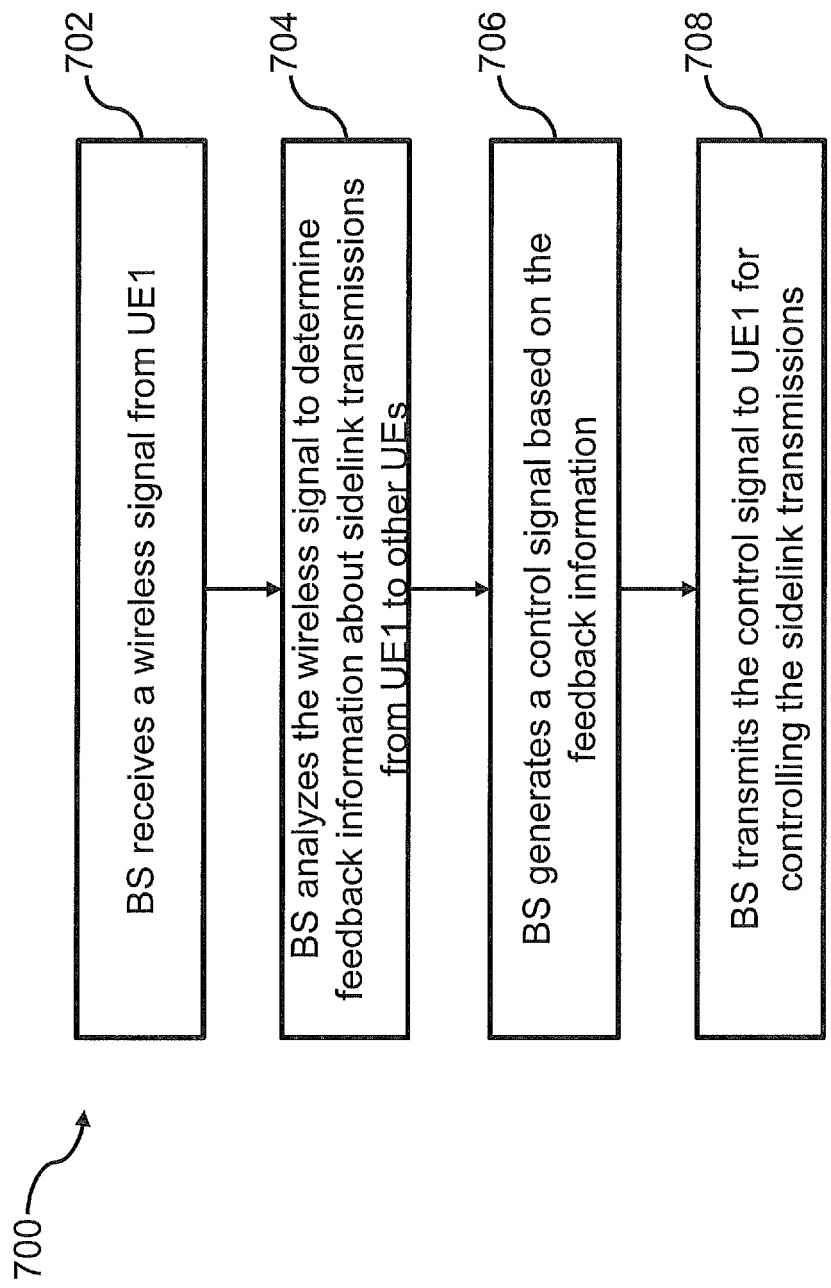
FIG. 7 illustrates a flow chart for a method performed by a BS for adapting parameters in wireless sidelink communications, in accordance with some embodiments of the present disclosure.

FIG. 7 illustrates a flow chart for a method 700 performed by a BS, e.g. the BS 600 in FIG. 6, for adapting parameters in wireless sidelink communications, in accordance with some embodiments of the present disclosure. At 702, BS receives a wireless signal from a UE, e.g. the relay UE UE1. At 704, BS analyzes the wireless signal to determine feedback information about sidelink transmissions from UE1 to other UEs, e.g. the remote UEs. BS generates at 706 a control signal based on the feedback information. BS transmits at 708 the control signal to UE1 for controlling the sidelink transmissions.

Figure 8:
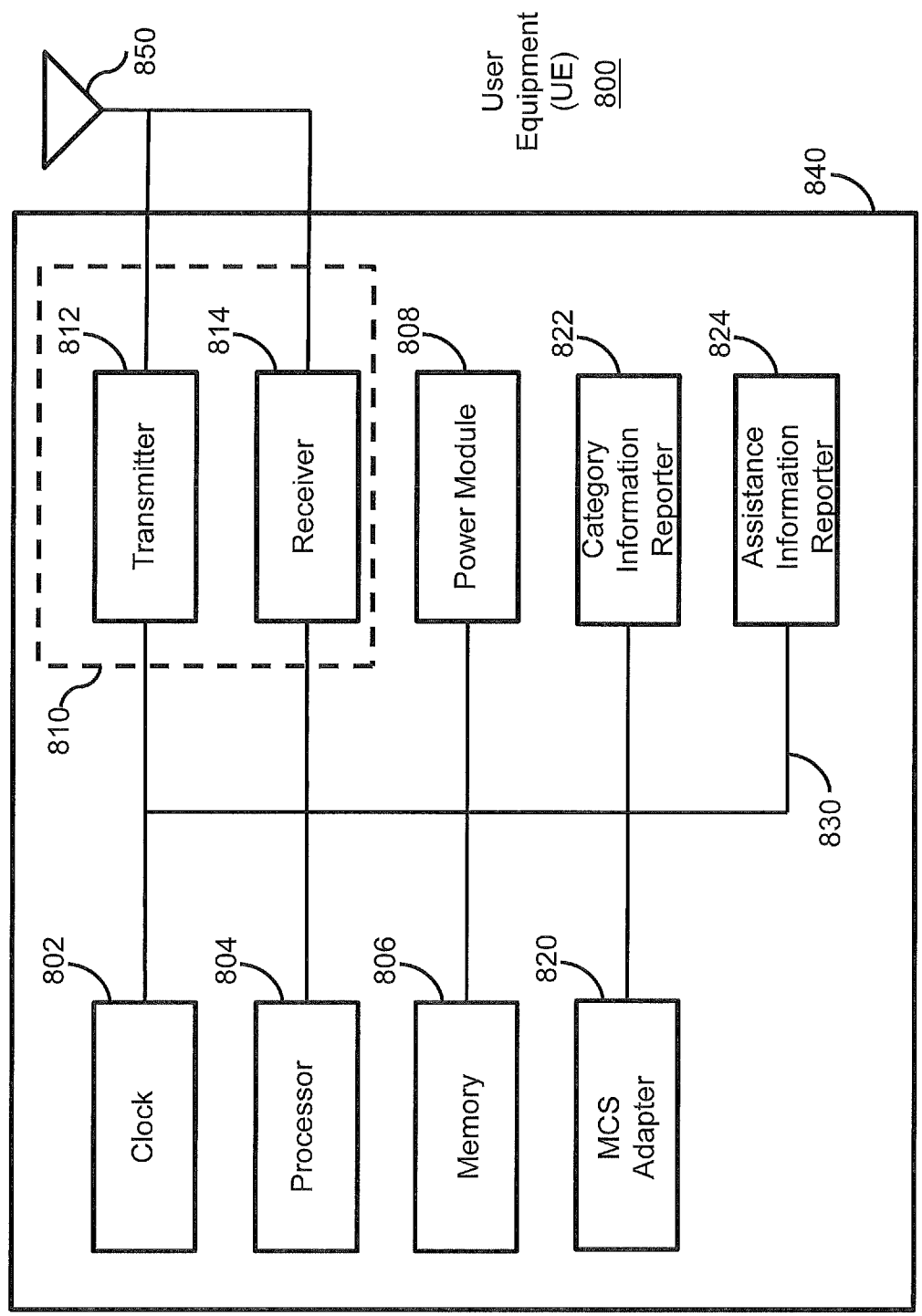
FIG. 8 illustrates another block diagram of a UE, in accordance with some embodiments of the present disclosure.

FIG. 8 illustrates a block diagram of a UE 800, in accordance with some embodiments of the present disclosure. The UE 800 is an example of a device that can be configured to implement the various methods described herein. As shown in FIG. 8, the UE 800 includes a housing 840 containing a system clock 802, a processor 804, a memory 806, a transceiver 810 comprising a transmitter 812 and a receiver 814, a power module 808, an MCS adapter 820, a category information reporter 822, and an assistance information reporter 824.

In this embodiment, the system clock 802, the processor 804, the memory 806, the transceiver 810 and the power module 808 work similarly to the system clock 302, the processor 304, the memory 306, the transceiver 310 and the power module 308 in the UE 300. An antenna 850 is typically attached to the housing 840 and electrically coupled to the transceiver 810.

The category information reporter 822 in this example can report UE category information to a BS. The UE category may be defined to indicate modulation and coding schemes (MCSs) supported by the UE 800 on sidelink communications. For example, to support 64 QAM on a sidelink transmission, the category information reporter 822 reports that the UE 800 supports physical sidelink shared channel (PSSCH) 64 QAM. The category information reporter 822 may send, via the transmitter 812, e.g. a UECapabilityInformation message to the BS to report its own UE category.

The MCS adapter 820 may receive, via the receiver 814, a wireless signal from the BS, and determines an MCS to be used in sidelink communications based on the wireless signal.

In one embodiment, the wireless signal carries system information generated by the BS to indicate whether the BS enables and permits the usage of a particular MCS, e.g. 64 QAM, on PSSCH by the UE 800. Based on the system information, the MCS adapter 820 can determine whether the particular MCS can and should be used for future sidelink communications.

In another embodiment, the wireless signal carries some threshold information for the MCS adapter 820 to determine an MCS to be used in the sidelink communications. For example, depending on the nature of the threshold information, the MCS adapter 820 may compare the threshold information with at least one of: a size of data to be transmitted in the sidelink communications, channel quality of the sidelink communications, a transmission range requirement for the data to be transmitted in the sidelink communications, and absolute speed or relative speed of the UE 800.

The assistance information reporter 824 in this example can report assistance information about the UE 800 and/or another UE to the BS. The assistance information of a node comprises at least one of: node speed, node acceleration, movement direction of the node, measurement information of a sidelink of the node, MCS related information, times of retransmission, and transmission resource information. In one example, assistance information of a node may include feedback information it received from another node about sidelink communications between the two nodes.

In one embodiment, the assistance information reporter 824 transmits, via the transmitter 812, its own assistance information to the BS, regardless whether the UE 800 serves as a relay UE or a remote UE in the cellular network.

In another embodiment, the UE 800 serves as a remote UE. In this case, the assistance information reporter 824 transmits, via the transmitter 812, its own assistance information to a relay UE. The relay UE will either forward the assistance information to the BS or perform configuration and/or adjustment of MCS of the relay UE in sidelink communications.

In yet another embodiment, the UE 800 serves as a relay UE. In this case, the assistance information reporter 824 receives, via the receiver 814, assistance information of at least one remote UE that receives data in the sidelink communication from the UE 800. The assistance information reporter 824 may report the assistance information to the BS or send the assistance information to the MCS adapter 820 for determining or modifying an MCS to be used in sidelink communications based on the assistance information.

It can be understood that according to different embodiments, a UE may include only one of the category information reporter 822 and the assistance information reporter 824 for MCS adaptation.

The various modules discussed above are coupled together by a bus system 830. The bus system 830 can include a data bus and, for example, a power bus, a control signal bus, and/or a status signal bus in addition to the data bus. It is understood that the modules of the UE 800 can be operatively coupled to one another using any suitable techniques and mediums.

Although a number of separate modules or components are illustrated in FIG. 8, persons of ordinary skill in the art will understand that one or more of the modules can be combined or commonly implemented. For example, the processor 804 can implement not only the functionality described above with respect to the processor 804, but also implement the functionality described above with respect to the MCS adapter 820. Conversely, each of the modules illustrated in FIG. 8 can be implemented using a plurality of separate components or elements.

Figure 9:
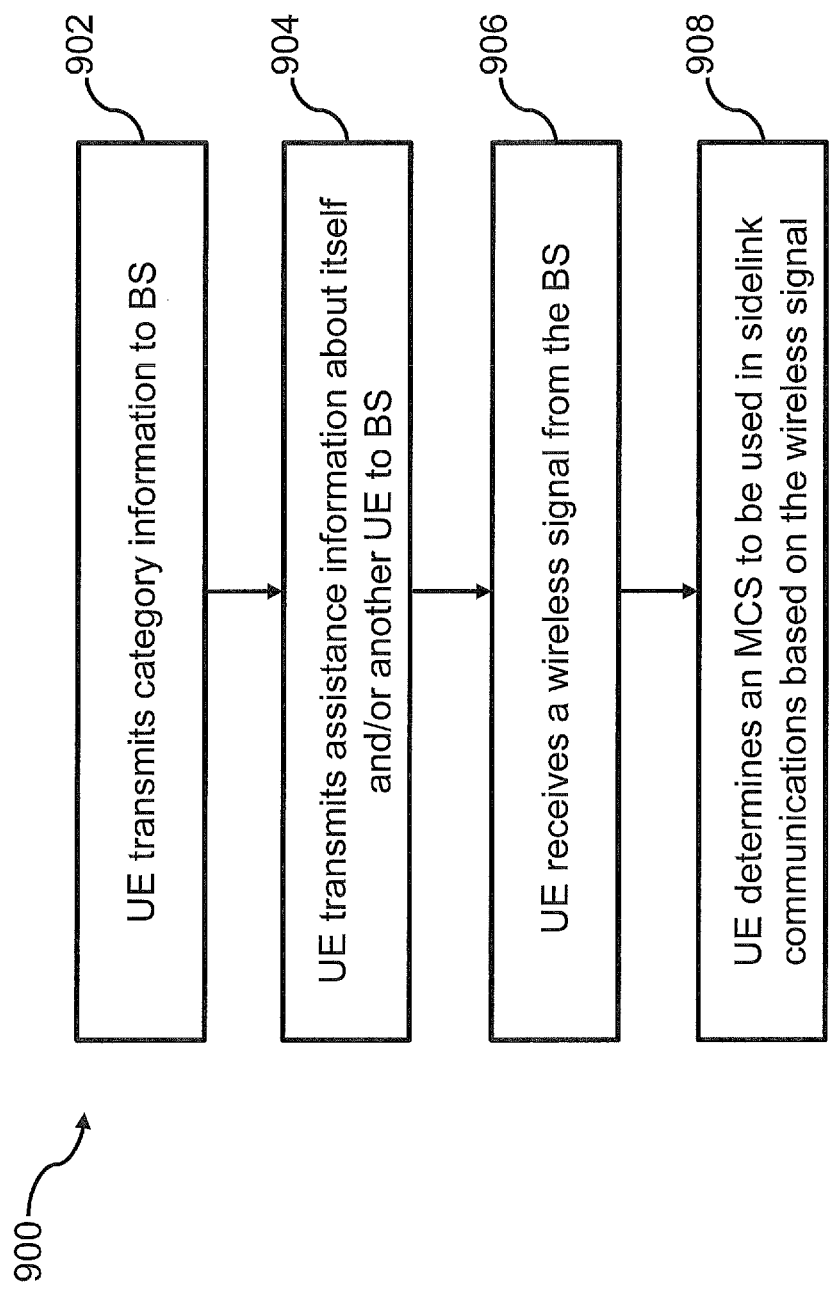
FIG. 9 illustrates a flow chart for a method performed by a UE for adapting modulation and coding scheme (MCS) in wireless sidelink communications, in accordance with some embodiments of the present disclosure.

FIG. 9 illustrates a flow chart for a method performed by a UE, e.g. the UE 800 in FIG. 8, for adapting MCS in wireless sidelink communications, in accordance with some embodiments of the present disclosure. At 902, UE transmits category information to BS. Optionally at 904, UE transmits assistance information about itself and/or another UE to BS. UE receives at 906 a wireless signal from the BS. At 908, UE determines an MCS to be used in sidelink communications based on the wireless signal.

Figure 10:
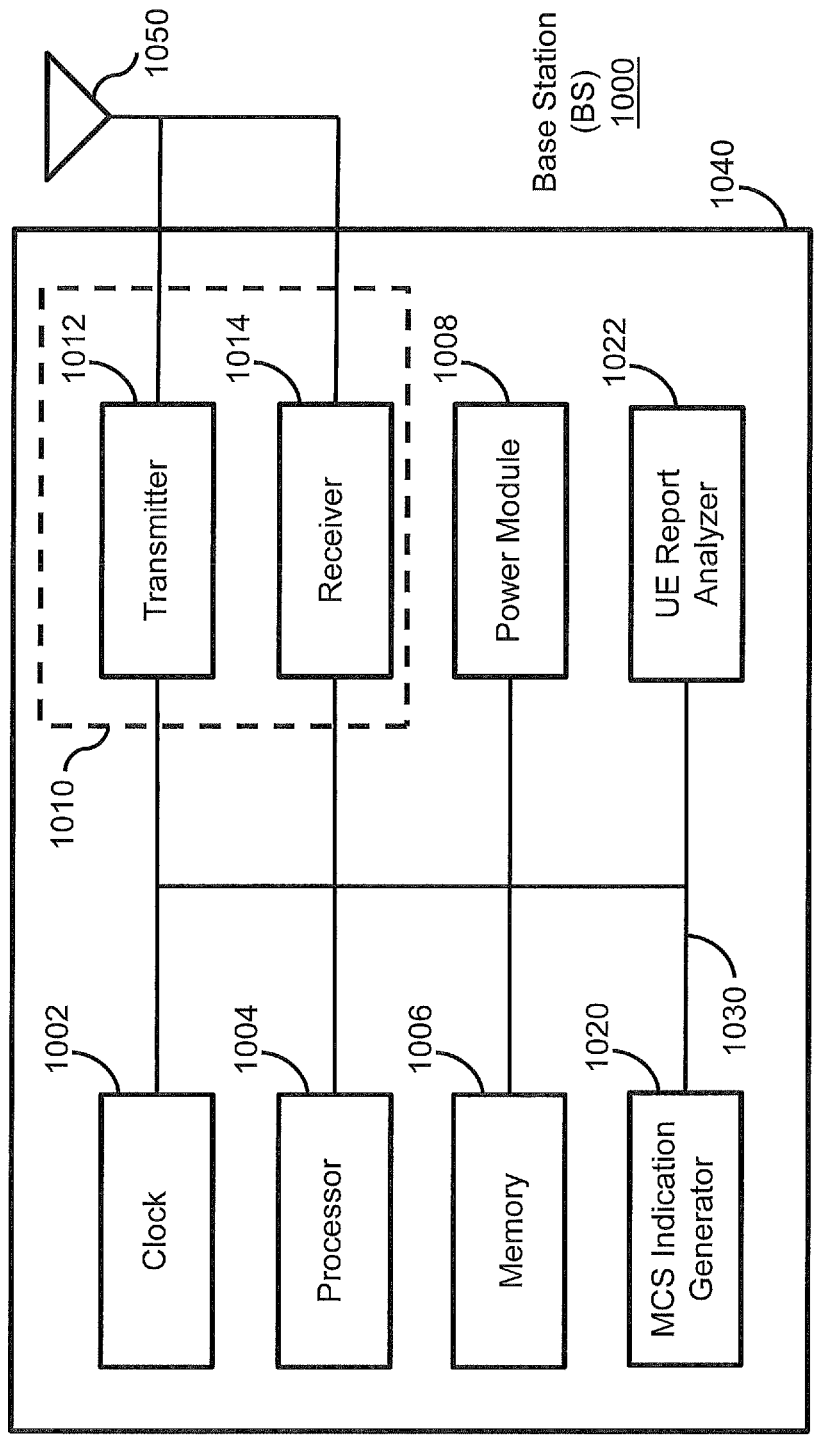
FIG. 10 illustrates another block diagram of a BS, in accordance with some embodiments of the present disclosure.

FIG. 10 illustrates another block diagram of a BS 1000, in accordance with some embodiments of the present disclosure. The BS 1000 is an example of a device that can be configured to implement the various methods described herein. As shown in FIG. 10, the BS 1000 includes a housing 1040 containing a system clock 1002, a processor 1004, a memory 1006, a transceiver 1010 comprising a transmitter 1012 and a receiver 1014, a power module 1008, an MCS indication generator 1020, and a UE report analyzer 1022.

In this embodiment, the system clock 1002, the processor 1004, the memory 1006, the transceiver 1010 and the power module 1008 work similarly to the system clock 302, the processor 304, the memory 306, the transceiver 310 and the power module 308 in the UE 300. An antenna 1050 is typically attached to the housing 1040 and electrically coupled to the transceiver 1010.

The UE report analyzer 1022 may receive, via the receiver 1014, a report from UE. For example, the UE report analyzer 1022 may receive, in the report, category information from a UE indicating whether the UE supports a particular MCS. The UE report analyzer 1022 may also receive, from a UE, assistance information about the UE itself and/or another UE, in the report. The UE report analyzer 1022 can analyze the report to determine MCS related information and send the information to the MCS indication generator 1020 for determining or configuring MCS for sidelink communications.

The MCS indication generator 1020 may configure or adjust an MCS to be used by the reporting UE in sidelink communications. For example, the MCS indication generator 1020 can generate a wireless signal based on the reported information, and transmit the wireless signal, via the transmitter 1012, to the reporting UE to indicate the configured MCS to be used in sidelink communications by the reporting UE.

The various modules discussed above are coupled together by a bus system 1030. The bus system 1030 can include a data bus and, for example, a power bus, a control signal bus, and/or a status signal bus in addition to the data bus. It is understood that the modules of the BS 1000 can be operatively coupled to one another using any suitable techniques and mediums.

Although a number of separate modules or components are illustrated in FIG. 10, persons of ordinary skill in the art will understand that one or more of the modules can be combined or commonly implemented. For example, the processor 1004 can implement not only the functionality described above with respect to the processor 1004, but also implement the functionality described above with respect to the MCS indication generator 1020. Conversely, each of the modules illustrated in FIG. 10 can be implemented using a plurality of separate components or elements.

Figure 11:
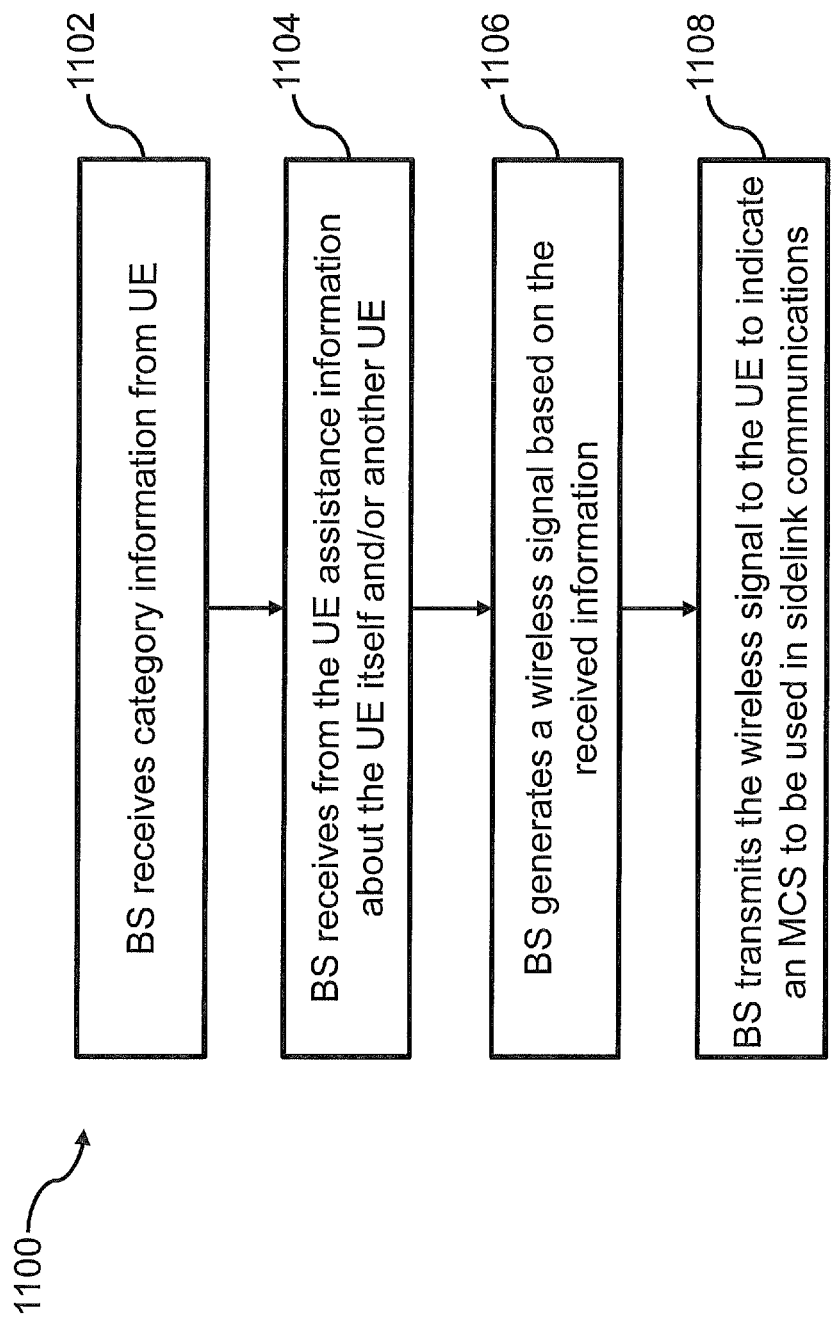
FIG. 11 illustrates a flow chart for a method performed by a BS for adapting MCS in wireless sidelink communications, in accordance with some embodiments of the present disclosure.

FIG. 11 illustrates a flow chart for a method 1100 performed by a BS, e.g. the BS 1000 in FIG. 10, for adapting MCS in wireless sidelink communications, in accordance with some embodiments of the present disclosure. At 1102, BS receives category information from UE. Optionally at 1104, BS receives, from the UE, assistance information about the UE itself and/or another UE. BS generates at 1106 a wireless signal based on the received information. BS transmits at 1108 the wireless signal to the UE to indicate an MCS to be used in sidelink communications by the UE.

Different embodiments of the present disclosure will now be described in detail hereinafter. It is noted that the features of the embodiments and examples in the present disclosure may be combined with each other in any manner without conflict.

In the following embodiments, UE1 and UE2, as well as UE1 and UE3, communicate with each other through sidelink (PC5). The sidelink transmission resources of UE2 and UE3 are scheduled by the BS or the relay UE. This can be applied in D2D or V2X scenarios. For example, when used in a D2D scenario, UE2 and UE3 may be remote UEs, both accessing the network through UE1 (the relay UE).

In a first embodiment, UE1 receives first feedback information from UE2 and/or UE3 through sidelink; and UE1 transmits second (forwarded) feedback information to the BS. The first feedback information includes at least one of the following: one or more process numbers each identifying a HARQ process running on the sidelink, ACK/NACK information for each HARQ process indicating whether the corresponding data was successfully received on the sidelink. The second forwarded feedback information includes at least one of the following: the first feedback information of one or more remote UEs received by the relay UE, the corresponding remote UE identification(s), retransmission indication, and resource allocation request indication, size of requested resources.

In the first embodiment, UE1 sends the second feedback information to the BS through a newly defined MAC CE (e.g. which may be referred to as PC5 feedback MAC CE). The PDU (Protocol Data Unit) containing the PC5 feedback MAC CE also contains the LCD (Logical Channel ID) for indicating the MAC CE type. A MAC PDU may contain feedback information for one or more remote UEs. In one example, a PC5 feedback MAC CE can contain a list of feedback messages for multiple remote UEs. In another example, a PC5 feedback MAC CE contains only one remote UE feedback information, and a MAC PDU can contain a list of PC5 feedback MAC CEs corresponding to one or more remote UEs. The BS may schedule resources, adjust the transmission parameters, or perform other adjustments as listed in FIG. 5, for at least one of UE1, UE2 and UE3, based on the second feedback information.

In a second embodiment, UE1 receives first feedback information from UE2 through sidelink; and UE1 transmits second (processed) feedback information to the BS. The first feedback information includes at least one of the following: process numbers, HARQ ACK/NACK information; the second (processed) feedback information includes: statistics of ACK feedback ratio received by the relay UE over a period of time from the remote UE, and the corresponding remote UE IDs. The ACK feedback ratio is a ratio between a total number of ACK feedback received from the remote UE and a total number of sidelink transmissions to the remote UE during the period of time.

In the second embodiment, UE1 sends the second feedback information to the BS via RRC (Radio Resource Control) dedicated signaling or MAC CE. If the second feedback information is sent via the MAC CE, then UE1 sends the second feedback information to the BS through a newly defined MAC CE (e.g. which may be referred to as the PC5 feedback MAC CE), and the MAC PDU containing the second feedback information also includes the LCID indicating the MAC CE type. The BS may schedule resources, adjust the transmission parameters, or perform other adjustments as listed in FIG. 5, for at least one of UE1, UE2 and/or UE3, based on the statistics of the ACK ratio.

In a third embodiment, UE1 receives sidelink communication data from UE2 and/or UE3. Different from the first embodiment, UE1 now generates feedback information and transmits it via a wireless signal to the eNB, without receiving feedback information from UE2 or UE3. In the other aspects, the third embodiment is similar to the first embodiment.

The wireless signal transmitted by UE1 in the third embodiment may include at least one: corresponding remote UE identity information; retransmission indication; resource allocation request indication; size of requested resources; and the feedback information for the sidelink communication between UE1 and one or more remote UEs which is generated by UE1, e.g. one or more HARQ process number, ACK/NACK information for each HARQ process.

In a fourth embodiment, UE1 receives sidelink communication data from UE2 and/or UE3. Different from the second embodiment, UE1 now generates feedback information and transmits it via a wireless signal to the eNB, without receiving feedback information from UE2 or UE3. In the other aspects, the fourth embodiment is similar to the second embodiment.

The wireless signal transmitted by UE1 in the fourth embodiment may include at least one: corresponding remote UE identity; and a ratio between a total number of acknowledgements and a total number of sidelink transmissions received from the one or more remote UEs during a certain time period.

The following embodiments are disclosed to support a modulation scheme, e.g. 64QAM, on sidelink communications. They can be applied in D2D or V2X scenarios.

In an embodiment, a new UE category is defined to indicate that the UE supports 64QAM in PSSCH, where PSSCH is used for data transmission in sidelink communications. The UE reports its own UE category to the BS. As one example, the UE may report the UE category to the BS, e.g. via the UECapabilityInformation message.

In another embodiment, the BS sends to UE, via the system message (e.g., SIB21), indication information indicating whether the BS can enable the usage of the 64QAM in PSSCH. Alternatively, the BS sends to UE, via RRC dedicated signaling, indication information indicating whether the UE can enable the usage of the 64QAM in PSSCH.

In yet another embodiment, the BS transmits to the UE, via the system message or RRC dedicated signaling, or the UE is pre-configured threshold information for the UE itself to determine whether or not to use or be allowed to use 64QAM. The UE determines whether or not to use 64QAM according to the threshold information. Specifically, the threshold information includes at least one of the following: threshold of the size of the data to be transmitted, the PSSCH or sidelink channel quality threshold, the threshold of transmission range requirement of the data to be transmitted, and the threshold of absolute speed or relative speed of the UE. In one example, if the PSSCH data to be transmitted is greater than or equal to the threshold of the size of the data to be transmitted, the UE uses 64QAM. In another example, if the PSSCH or sidelink channel quality is greater than or equal to the PSSCH or sidelink channel quality threshold, the UE uses 64QAM. In particular, the PSSCH or sidelink channel quality threshold may be: (a) the RSRP (Reference Signal Received Power), or RSRQ (Reference Signal Received Quality), or RSSI (Received Signal Strength Indicator) threshold of the PSSCH; or (b) by defining a new reference signal/resource for measuring the PSSCH channel quality, measuring the new reference signal/resource to obtain the PSSCH channel quality threshold. In a different example, if the transmission range requirement of the data to be transmitted is less than or equal to the threshold of transmission range requirement of the data to be transmitted, the UE uses 64QAM.

In a different embodiment, assistance information is utilized to determine whether 64QAM should be used for sidelink communications between UE1 and UE2. The BS or UE obtains UE assistance information and performs transmission parameters related configuration or adjustment according to the information. For example, the BS or UE may determine whether the UE uses 64QAM on sidelink communications based on the information.

The UE assistance information includes at least one of the following: speed of UE1 and/or UE2, acceleration of UE1 and/or UE2, movement direction of UE1 and/or UE2, sidelink measurement information of the sidelink communication, MCS information, retransmission times, and transmission resource information. The sidelink measurement information includes at least one of the following: SL RSRP measurement results, SL RSRQ measurement results, SL RSSI measurement results, SL CSI (channel state information), which contains at least CQI (Channel Quality Indicator) index information.

In one embodiment, UE1 and/or UE2 transmit its own UE assistance information to the BS, and the BS configures or adjusts transmission parameters for UE1 and/or UE2 according to the received UE assistance information. Optionally, UE1 and/or UE2 may send UE assistance information to the BS via PUCCH (Physical Uplink Control Channel) or MAC CE or RRC dedicated signaling.

In another embodiment, a receiving UE transmits its UE assistance information to the transmission UE through the sidelink, and the transmission UE transmits the UE assistance information of the receiving UE to the BS. The BS performs transmission parameters related configuration or adjustment on the transmission UE and/or the receiving UE according to the received UE assistance information. The receiving UE may transmit the UE assistance information to the transmission UE through the PSSCH or the PSCCH.

In yet another embodiment, a receiving UE transmits the UE assistance information to the transmission UE through the sidelink, and the transmission UE performs transmission parameters related configuration or adjustment on itself according to the received UE assistance information. The receiving UE may transmit the UE assistance information to the transmission UE through the PSSCH or the PSCCH.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first node, the method comprising:
    transmitting a wireless signal to a second node, wherein
        the wireless signal is related to sidelink communication between the first node and at least one third node, and
        the wireless signal carries information that comprises:
            identity information for the at least one third node,
            resource allocation request indication, a ratio between a total number of acknowledgements received from the at least one third node and a total number of sidelink transmissions to the at least one third node from the first node during a certain time period, and sizes of requested resources; and receiving a control signal from the second node, wherein the control signal is generated by the second node based on the wireless signal and includes information for controlling the sidelink communication between the first node and the at least one third node.

2. The method of claim 1, wherein the wireless signal is generated based on feedback information received by the first node from the at least one third node that performs sidelink communication with the first node.

3. The method of claim 2, wherein the wireless signal further carries information that comprises:

the feedback information received from the at least one third node.

4. The method of claim 2, wherein the feedback information includes at least one of:

one or more process numbers each of which identifies a HARQ (Hybrid Automatic Repeat Request) process for the sidelink communication between the first node and the at least one third node; or acknowledgement or negative acknowledgement information for the corresponding HARQ process.

5. The method of claim 1, wherein the wireless signal further carries information that comprises at least one of the following:

retransmission indication;

feedback information generated by the first node for the sidelink communication between the first node and the at least one third node; or a ratio between a total number of acknowledgements received from the at least one third node and a total number of sidelink transmissions to the at least one third node during a certain time period.

6. The method of claim 1, wherein:

the wireless signal is transmitted via at least one of: (a) radio resource control (RRC) signaling, or (b) media access control (MAC) control element (CE) with logical channel identity (LCD) that indicates a type of the MAC CE; and the control signal is received via at least one of: RRC signaling, MAC CE, and physical downlink control channel (PDCCH).

7. The method of claim 1, wherein the control signal comprises at least one of the following information:

transmit power of the sidelink communication;

maximum transmit power of the sidelink communication;

communication resource for the sidelink communication;

transmission resource pool for the sidelink communication;

MCS (Modulation and Coding Scheme) for the sidelink communication;

modulation order for the sidelink communication;

retransmission number; or maximum retransmission number.

8. The method of claim 1, further comprising:

determining a modulation scheme to be used in the sidelink communication based on the control signal.

9. The method of claim 8, further comprising:

transmitting category information to the second node, wherein the category information indicates one or more modulation schemes supported by the first node in a sidelink communication.

10. The method of claim 8, wherein:

the determined modulation scheme is 64 quadrature amplitude modulation (QAM) to be used on a physical sidelink shared channel (PSSCH); and the control signal indicates whether usage of 64QAM on the PSSCH is enabled.

11. The method of claim 8, wherein:

the control signal carries threshold information; and the modulation scheme to be used in the sidelink communication is determined by comparing the threshold information with at least one of:

a size of data to be transmitted in the sidelink communication, channel quality of the sidelink communication, a transmission range requirement for the data to be transmitted in the sidelink communication, absolute speed of the first node, or relative speed of the first node.

12. The method of claim 8, further comprising transmitting assistance information about sidelink communication between the first node and the at least one third node to the second node, wherein:

the assistance information is received from the at least one third node or generated by the first node; and the assistance information is utilized by the second node to determine the modulation scheme to be used in the sidelink communication.

13. The method of claim 12, wherein the assistance information comprises at least one of: speed of the first node, speed of the at least one third node, acceleration of the first node, acceleration of the at least one third node, movement direction of the first node, movement direction of the at least one third node, sidelink measurement information of the sidelink communication, MCS related information, times of retransmission, or transmission resource information.

14. A method performed by a first node, the method comprising:

receiving a wireless signal from a second node, wherein the wireless signal is related to sidelink communication between the second node and at least one third node, the wireless signal carries information that comprises:

identity information for the at least one third node, resource allocation request indication, a ratio between a total number of acknowledgements received from the at least one third node and a total number of sidelink transmissions to the at least one third node from the second node during a certain time period, and sizes of requested resources;

generating a control signal based on the wireless signal, wherein the control signal includes information for controlling the sidelink communication between the second node and the at least one third node; and transmitting the control signal to the second node.

15. The method of claim 14, wherein:

the wireless signal is generated by the second node based on feedback information; and the feedback information is received by the second node from the at least one third node that performs sidelink communication with the second node.

16. The method of claim 15, wherein the wireless signal further carries information that comprises:

the feedback information received from the at least one third node.

17. The method of claim 15, wherein the feedback information includes at least one of:

one or more process numbers each of which identifies a HARQ (Hybrid Automatic Repeat Request) process for the sidelink communication between the second node and the at least one third node; or acknowledgement or negative acknowledgement information for the corresponding HARQ process.

18. The method of claim 14, wherein the wireless signal further carries information that comprises at least one of the following:
- retransmission indication;
- feedback information generated by the second node for the sidelink communication between the second node and the at least one third node; or
- a ratio between a total number of acknowledgements received from the at least one third node and a total number of sidelink transmissions to the at least one third node from the second node during a certain time period.

19. The method of claim 14, wherein:
- the wireless signal is received via at least one of: (a) radio resource control (RRC) signaling, or (b) media access control (MAC) control element (CE) with logical channel identity (LCD) that indicates a type of the MAC CE; and
- the control signal is transmitted via at least one of: RRC signaling, MAC CE, or physical downlink control channel (PDCCH).

20. The method of claim 14, wherein the control signal comprises at least one of the following information:
- transmit power of the sidelink communication;
- maximum transmit power of the sidelink communication;
- communication resource for the sidelink communication;
- transmission resource pool for the sidelink communication;
- MCS (Modulation and Coding Scheme) for the sidelink communication;
- modulation order for the sidelink communication;
- retransmission number; or
- maximum retransmission number.

* * * * *